United States Patent [19]

Kortschinski et al.

[11] Patent Number: 4,710,847
[45] Date of Patent: Dec. 1, 1987

[54] CURRENT-LIMITING SURGE ARRESTER DISCONNECTOR

[76] Inventors: Juri Kortschinski, 1414 Lochlin Trail, Mississauga, Ontario, Canada, L5G 3V3; Michael V. Lat, 1431 Monaghan Circle, Mississauga, Ontario, Canada, L5C 1R7; Claude G. Maurice, 62 Royal Salisbury Way, Brampton, Ontario, Canada, L6V 3J7; Derek C. Tickner, 477 Dorland Road, Oakville, Ontario, Canada, L6J 6B3

[21] Appl. No.: 871,685

[22] Filed: Jun. 9, 1986

[51] Int. Cl.[4] .............................................. H02H 1/04
[52] U.S. Cl. ..................................... 361/125; 361/56; 361/124; 361/134
[58] Field of Search ................... 361/117–120, 361/124, 125, 131, 134, 126, 135, 136, 54, 56, 91

[56] References Cited

U.S. PATENT DOCUMENTS

| | | | |
|---|---|---|---|
| 2,315,320 | 3/1943 | Earle | 361/125 |
| 3,179,851 | 4/1965 | Smith, Jr. | 361/120 X |
| 4,062,054 | 12/1977 | Simokat | 361/120 X |
| 4,204,238 | 5/1980 | Stetson | 361/134 X |
| 4,308,566 | 12/1981 | Imataki et al. | 361/124 X |
| 4,471,402 | 9/1984 | Cunningham | 361/125 |
| 4,503,414 | 3/1985 | Sykes et al. | 361/131 X |

FOREIGN PATENT DOCUMENTS 976228  10/1975  Canada ............................ 361/136

Primary Examiner—M. H. Paschall
Assistant Examiner—A. Jonathan Wysocki
Attorney, Agent, or Firm—Ridout & Maybee

[57] ABSTRACT

A protective device for use with a surge arrester to prevent fracturing of the porcelain body of a failed arrester includes a fast-operating switch which shunts a current-limiting fuse. The switch is operated by ignition of a chemical propellant charge, thereby rapidly diverting fault current to the fuse and additionally isolating the arrester from ground. The switch has a moving contact in the form of a gas-driven piston which strikes a separable terminal connected to a ground lead.

8 Claims, 7 Drawing Figures

CURRENT-LIMITING SURGE ARRESTER DISCONNECTOR

FIELD OF THE INVENTION

This invention relates to a protective device for use in association with surge arresters.

BACKGROUND OF THE INVENTION

Surge arresters used in distribution systems can fail and explode violently in certain conditions creating serious hazards for linemen and others. Attempts have been made to reduce such hazards by improving the overall quality of arrester design, by developing shatter-proof housings for the arresters, and by devising switches for cutting off the fault current through an arrester so as to prevent its explosion. The present invention is based on the last of these possible approaches to the problem.

SUMMARY OF THE INVENTION

Essentially, a protective device in accordance with the present invention is adapted to prevent the fracturing of the body of a failed surge arrester and even to prevent the venting of arc-generated gases, by rapidly cutting off the fault current flowing through the failed arrester. Its operating principle is based on the use of a fast switch operated by a chemical propellant, the switch shunting a current-limiting fuse.

Thus, according to the present invention, a protective device for use in association with a surge arrester comprises an insulative casing, a first terminal mounted at one end of the housing, said first terminal providing means for connection to the ground lead terminal of the surge arrester, a second terminal mounted at the other end of the housing, said second terminal having a separable portion providing means for connection to a ground lead, a current-limiting fuse connected in circuit between said first and second terminals, a bypass switch shunting the current-limiting fuse, a fault-sensing device in series with the bypass switch and said first terminal, triggering means responsive to the fault-sensing device for opening the bypass switch, thereby to direct switch current to the fuse, the bypass switch having a movable element which, when operated by the triggering means, is constrained to strike said separable portion of the second terminal, thereby separating said portion and so isolating the surge arrester from ground.

In a preferred form of the invention, the bypass switch has a fixed contact formed by a metal cap defining a chamber for housing a chemical propellant charge, and a moving contact formed by a piston which is driven from its closed switch position, when the charge is ignited, into striking engagement with the separable portion of the second terminal.

BRIEF DESCRIPTION OF THE DRAWINGS

In order that the invention may be readily understood, one protective device in accordance with the invention, for use in association with a surge arrester, will now be described by way of example with reference to the accompanying drawings. In the drawings.

DESCRIPTION OF THE PREFERRED EMBODIMENTS

Figure 1:
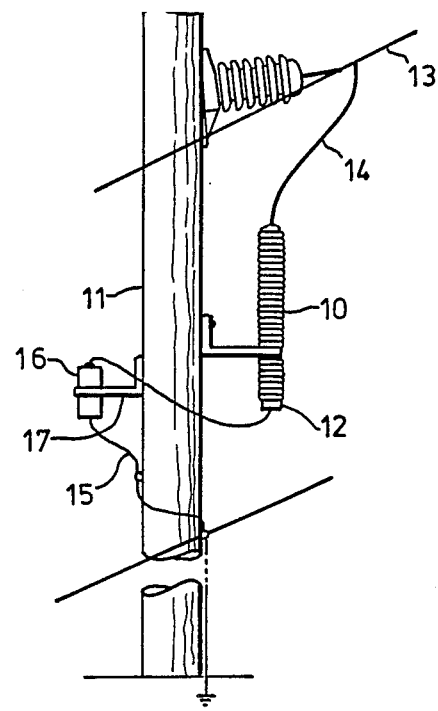
FIG. 1 illustrates one possible installation of the device.

FIG. 1 shows a surge arrester 10 mounted on a utility pole 11. The surge arrester 10 is of a conventional type having a porcelain body and providing a high voltage terminal and a ground lead terminal 12. The high voltage terminal is connected to the power supply conductor 13 by a conductor 14. The ground lead terminal of the arrester is connected to the usual ground lead 15 via a protective device 16 mounted separately on the utility pole 11 by a bracket 17. The protective device 16 will be described in detail subsequently.

Figure 2:
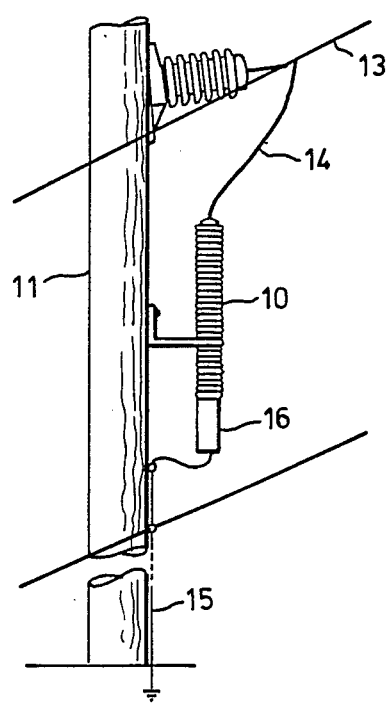
FIG. 2 illustrates another possible installation of the device.

FIG. 2 differs from FIG. 1 in that the device 16 is attached directly to the ground lead terminal of the surge arrester instead of being mounted on a separate mounting bracket.

Figure 3:
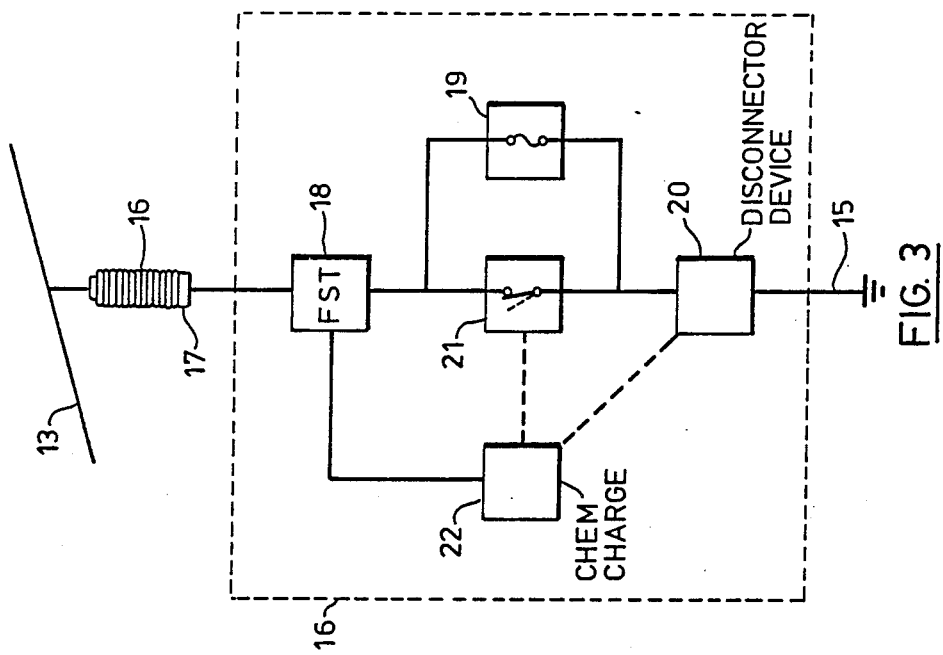
FIG. 3 is a schematic block diagram illustrating the principle of operation of the device.

The protective device 16 in FIGS. 1 and 2 is a current-limiting disconnector for isolating the arrester 10 in the event of arrester failure. The principle of its operation is based on the use of a fast operating bypass switch that shunts an internal current-limiting type fuse, the switch being operated by a chemical charge propellant. Thus, as shown in FIG. 3, the device 16 is connected between the ground lead terminal 17 of the arrester 10 and ground. The device houses a fault sensing and triggering circuit 18 connected in series with a current limiting fuse 19 and the ground lead 15 through a disconnector device 20. The current limiting fuse is shunted by a switch 21 which normally bypasses the fuse 19. The bypass switch 21 is adapted to be operated by a chemical charge 22 when the latter is triggered by the fault sensing and triggering circuit 18. This operation, in turn, will actuate the disconnector device to isolate the arrester from ground.

Under normal conditions, the ground lead terminal 17 of the arrester 10 is grounded through the fault sensing and triggering circuit 18, the switch 21, the disconnector device 20, and ground lead 15. If the arrester 10 fails, either a full fault current, or an extended duration power-follow current, will flow through it. These conditions will be detected by the passive solid-state fault-sensing and triggering circuit 18, which will trigger the chemical charge 22. The gas pressure generated by the chemical charge will open the bypass switch 21. This will cause the fault current to transfer to the current limiting fuse 19, where it will be interrupted.

The operation of the bypass switch 21 also causes the disconnector device 20 to separate and physically remove the flexible pigtail ground lead 15 from the bottom of the device. The separation of the ground lead 15 provides a reliable and obvious indication of the operation of the device and, therefore, of arrester failure. The disconnector device 20 is also designed to interrupt low magnitude power-follow currents which would be below the minimum interrupting capability of the current limiting fuse 19.

Figure 4:
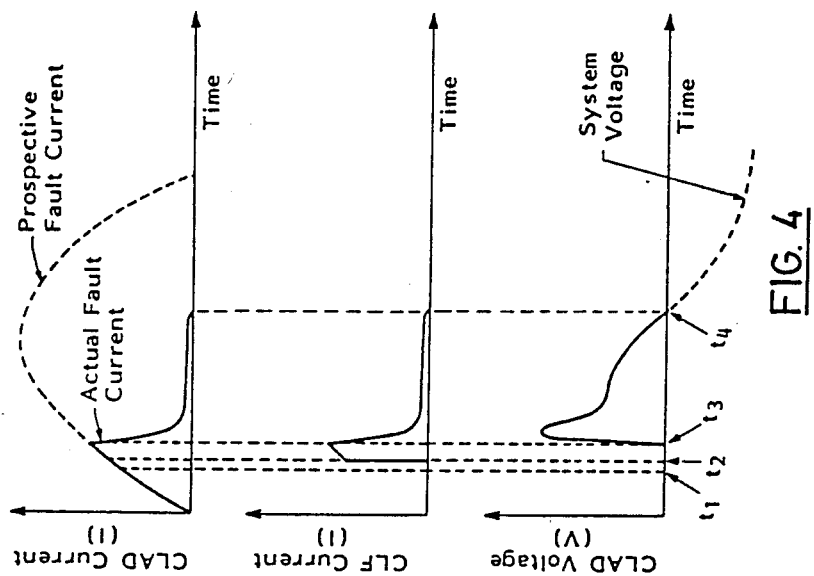
FIG. 4 is a timing diagram showing current and voltage waveforms in operation of the device.

FIG. 4 shows qualitatively the current and voltage wave shapes associated with the operation of the device 16.

The combination of the bypass switch 21, the current limiting fuse 19 and the disconnector device 20 has a number of attractive operating features. Unless the switch 21 is triggered and opens, all normal lightning discharge currents and power-follow currents flow through the low-impedance path of the switch, removing any possibility of the fuse element 19 becoming damaged and operating incorrectly, as long as the surge arrester 10 is intact and functions properly. At the same time, the fact that the fuse 19 does not normally carry any current and must support the system voltage for only a very short fraction of a second, after the bypass switch 21 operates and before the ground lead 15 is physically separated, allows for a significant compaction of the fuse design, compared with the designs of conventional current-limiting fuses. A fuse for the present purpose is optimized only for the interruption duty, without the usual compromises in the designs of conventional current-limiting fuses, which are dictated by the need to accommodate continuous current as well as to interrupt fault currents fast.

Electrically, the entire process is equivalent to fault interruption by a conventional current-limiting fuse, and will not cause upstream protective devices, such as line fuses or reclosures, to operate.

The device 16 is designed to withstand all normal lightning-surge discharge operations of the arrester and will not be triggered either by the actual normal lightning surge, or by the power-follow current of normal duration.

Figure 5:
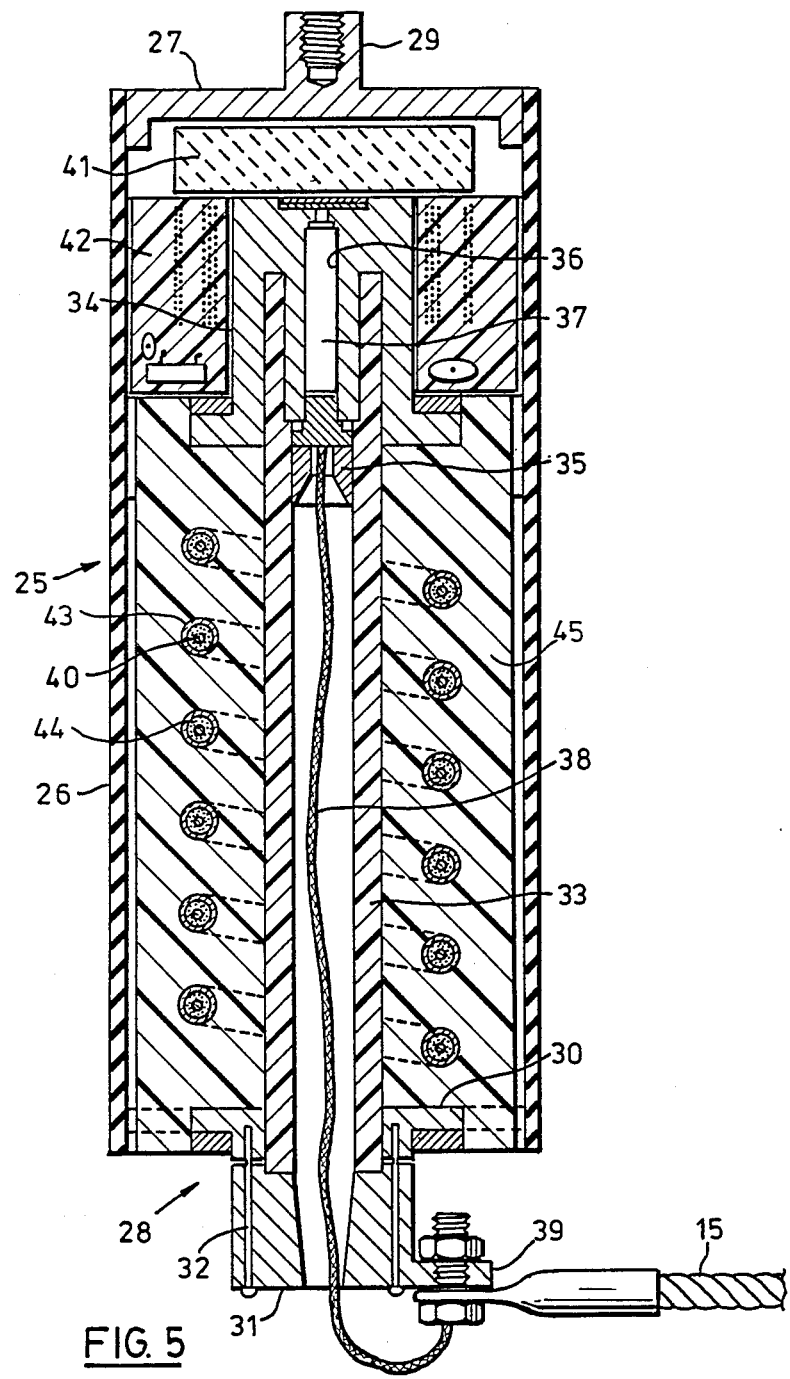
FIG. 5 is a cross sectional view of the device.

Referring now to FIG. 5, the protective device of the present invention comprises an insulative housing 25 having an external casing 26 which is preferably a thin-walled cylindrical tube of fibre glass reinforced plastic, (FRP). The upper end of the casing is closed by a first terminal 27 mounted thereat, and the lower end of the tube is closed by a second terminal 28. These terminals both provide means for connecting the device in circuit with the surge arrester and the associated ground lead. Thus, the terminal 27 is formed with an external, internally threaded, boss 29 by which the device can be connected directly to the ground lead terminal of the surge arrester. The second terminal 28 is a composite structure comprising an internal portion 30 and a separable external portion 31 which is connected to the portion 30 by frangible bolts 32. The terminal portions 30 and 31 are generally annular as shown, and arranged coaxially with the casing 26.

A tubular cylinder 33 of fibre glass reinforced plastic is mounted in the housing 25, coaxially with the casing 26, so as to define a longitudinally extending channel therein. The lower end of the cylinder 33 is secured by the terminal portion 30 and extends through a central opening in said portion to the separable terminal portion 31.

The bypass switch 21 of FIG. 3 is shown in FIG. 5 as comprising a fixed contact 34, and a sliding contact 35. The fixed contact 34 takes the form of a metal cap mounted on the upper end of the cylinder 33 so as to close the upper end of the cylinder. The metal cap 34 is formed with an axially extending chamber 36 which houses a chemical charge propellant capsule 37. The sliding contact 35 consists of a metal piston having a tapered portion which, in the closed switch position, engages the first contact 34. In this position the tapered portion of the piston is a press fit in the entrance of the chamber 36 which is of complementary shape. This piston 35 is displaceable from the closed switch position, as hereinafter described, so as to slide along the cylinder 33 to a lower limit position at which it engages the separable portion 31 of the second or lower terminal 28.

The sliding contact or piston 35 is connected, by means of a flexible copper conductor 38 extending through the cylinder 33, to a ground lead terminal 39 mounted on the separable terminal portion 31. The ground lead is indicated at 15.

A current-limiting fuse 40 is connected between the fixed switch contact 34 and the separable portion 31 of the terminal 28. Thus, under normal conditions in which the bypass switch is closed, no current flows through the fuse.

A non-linear resistor 41, and a fault sensing and triggering module 42, are connected in circuit between the terminal 27 and the switch contact 34. Thus in the absence of fault current, the current flowing in the surge arrester will bypass the fuse and flow to ground via the bypass switch. In the event that the surge arrester fails, fault current is detected by the module 42, which thereupon ignites the chemical charge propellant thereby rapidly actuating the bypass switch. In this case the piston 35 is driven from the closed switch position, immediately diverting the fault current through the fuse 40. The fuse melts. Meanwhile the piston 35 continues to travel along the cylinder 33 until it reaches its lower limit position defined by the terminal portion 31. When the piston 35 strikes the separable terminal portion 31, the latter is broken away thereby isolating the surge arrester from ground. The piston 35 is a composite member, its upper tapered portion being of hardened steel and its lower portion being of aluminium. The said lower portion of the piston takes the form of an annulus having a chamfered lower end which, as it enters the tapered bore of the separable terminal portion 31, is deformed plastically so as to absorb the considerable kinetic energy of the piston 35.

In the construction shown in FIG. 5, the current limiting fuse 40 comprises an aluminium notched element 40 housed in a helically coiled glass tube 43 filled with sand 44. This helical assembly is mounted coaxially with the cylinder 33 and is encapsulated in fibre-reinforced plastic 45 or alternatively cement.

Figure 7:
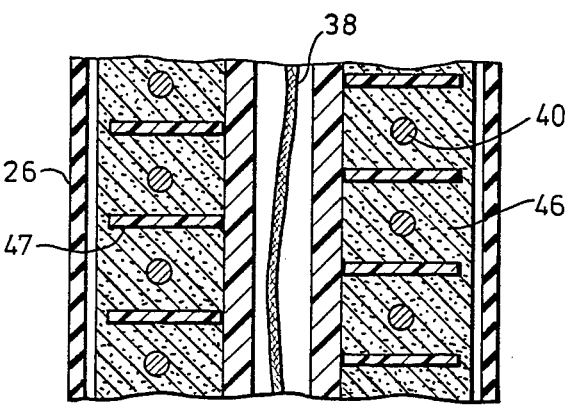
FIG. 7 is a fragmentary cross sectional view of the device with an alternative current limiting fuse.

In an alternative construction, a detail of which is shown in FIG. 7, the current limiting fuse 40 is a solid metal element wound helically and embedded in sand 46 so as to be concentric with the plastic cylinder 33. The turns of the fusible element 46 are shielded from one another by a helically formed plastic strip 47 which prevents arcing between adjacent turns.

With the constructions of current limiting fuse described above, wherein the fuse element is helically coiled and encapsulated or embedded in a material substantially filling the space between the inner cylinder 33 and the casing 26, adjacent turns being shielded from one another to prevent arcing, it is possible to keep the axial length of the fuse to a minimum for a given fuse path length so that the overall dimensions of the device shall remain compatible with typical arrester sizes and pole-top geometries.

Figure 6:
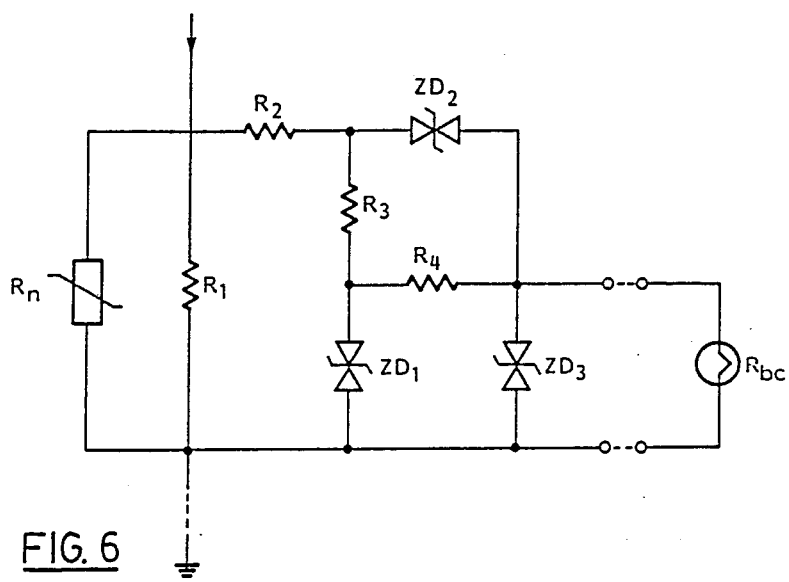
FIG. 6 is a schematic circuit diagram of a fault sensing circuit used in the device.

The design of the fault sensing and triggering circuit 42 is based on the design criteria for currently available silicon carbide gapped surge arresters, and also gapless metal oxide surge arresters, used on distribution systems. The circuit must be capable of withstanding the normal arrester duty with a good margin, and yet respond quickly in the event of arrester failure. The required operating characteristics are achieved with a passive solid-state circuit as shown in FIG. 6. The circuit employs Zener diodes $ZD_1$, $ZD_2$, $ZD_3$, linear resistors $R_1$, $R_2$, $R_3$ and $R_4$, and one non-linear resistor $R_n$. An electrically triggered chemical propellant capsule $R_{bc}$ is connected across the Zener diode $ZD_3$ for igniting the chemical charge 42.

The sequence of operations of the circuit, for each of four possible fault conditions (a), (b), (c) and (d), will now be described.

(a) For leakage currents and very low power-follow currents:
  a very low voltage is developed across the main sensing resistor, $R_1$;
  no Zener diode conducts;
  current through the capsule $R_{bc}$ is determined by $R_2$, $R_3$, $R_4$ and $R_{bc}$ connected in series;
  operation time is determined by the capsule characteristics.

(b) For power-follow currents:
  Zener diode $ZD_1$, conducts;
  a constant current flows through the capsule $R_{bc}$ determined by the voltage across $ZD_1$ and resistances of $R_4$ and $R_{bc}$, connected in series;
  a fixed operating delay of the propellant capsule is established.

(c) For high power-follow currents and for fault currents:
  Zener diodes $ZD_1$ and $ZD_2$ conduct;
  current through the propellant capsule increases sharply, as $ZD_2$ goes into conduction;
  a very fast response of the propellant capsule is achieved.

(d) For very high, short duration lightning impulse currents:
  all Zener diodes conduct;
  a constant current through the propellant capsule is established, which is independent of lightning surge current magnitude;
  the propellant capsule is not triggered because of the very short duration of the lightning surge;
  non-linear resistor $R_n$ reduces the duty on all Zener diodes during lightning surge discharges, by limiting the voltage across $R_1$.

A current limiting arrester disconnector according to the present invention has a number of outstanding advantages which may be summarized as follows:
1. The device serves not only to eliminate explosion of failed surge arresters or violent expulsion of their internal components, but also to prevent venting of arc gases through the end caps.
2. The device is equally effective with all types of surge arresters, and furthermore can be designed to be attached directly to an arrester.
3. The device will not cause customer outages due to arrester failure.
4. The use of this device permits manufacturers to concentrate their product improvement efforts on optimizing surge protective characteristics of arresters, rather than on achieving safe modes of failure.

We claim:

1. A protective device for use in association with a surge arrester having a ground lead terminal, the device being capable of limiting and interrupting fault current, comprising
  an insulative housing,
  a first terminal mounted at one end of the housing, said first terminal providing means for connection to the ground lead terminal of a surge arrester,
  a second terminal mounted at the other end of the housing, said second terminal having a separable portion providing means for connection to a ground lead,
  a current-limiting fuse connected in circuit between said first and second terminals,
  a bypass switch shunting the current-limiting fuse,
  a fault-sensing device in series with the bypass switch and said first terminal,
  triggering means responsive to the fault-sensing device for opening the bypass switch, thereby to direct switch current to the fuse,
  the bypass switch having a movable element which, when operated by the triggering means, is constrained to strike said separable portion of the second terminal, thereby separating said portion and so isolating the surge arrester from ground.

2. A protective device according to claim 1, wherein the movable element of the bypass switch is constituted by a metal piston constrained to move along a cylinder extending to said separable portion of the second terminal, said triggering means comprising a chemical charge adapted to be ignited by the fault sensing device for driving the piston from its closed switch position.

3. A protective device for use in association with a surge arrester having a ground lead terminal, the device being capable of limiting and interrupting fault current, comprising
  an insulative housing,
  first terminal means mounted at one end of the housing, said first terminal means providing external means for connection to the ground lead terminal of a surge arrester,
  second terminal means mounted at the other end of the housing, said second terminal means having a separable external portion providing means for connection to a ground lead,
  a current-limiting fuse connected in circuit between said first and second terminal means,
  a bypass switch shunting the fuse, said bypass switch having a fixed contact formed by a metal cap providing an internal chamber for housing a chemical propellant charge, and a movable contact operable by ignition of the chemical propellant charge to open the switch,
  fault sensing means connected in circuit between the first terminal means and said fixed contact, triggering means responsive to said fault sensing means for igniting the charge in response to a fault condition, thereby to open the bypass switch and so direct switch current to the fuse, and
  means constraining the movable switch element, when operated to open the switch, to strike said separable portion of the second terminal means thereby separating said portion and so isolating the surge arrest from ground.

4. A protective device according to claim 3, wherein said movable contact is a metal piston connected to said ground lead connection means by a flexible lead, the piston being constrained to move along a guide channel extending to said separable terminal portion.

5. A protective device according to claim 4, wherein the metal piston includes a plastically deformable portion for absorbing kinetic energy of the piston upon striking said separable terminal portion.

6. A protective device according to claim 4, wherein the second terminal means comprises an annular terminal portion fixedly mounted at said other end of the housing, said separable portion being externally connected to it by frangible bolts, and said constraining means comprising an insulative cylinder defining said guide channel extending from the switch head to the separable terminal portion.

7. A surge arrester disconnector for use in association with a surge arrester having a ground lead terminal, the device being capable of limiting and interrupting fault current, comprising an insulative cylindrical housing, first terminal means mounted at one end of the housing, said first terminal means having a cap portion closing said one end and an external portion providing means for connection to the ground lead terminal of a surge arrester, second terminal means mounted at the other end of the housing, said second terminal means having an annular terminal portion fixedly mounted at said other end and an external separable portion connected thereto by frangible fastenings, said external separable portion providing means for connection to a ground lead, an insulative cylinder mounted in the housing coaxially therewith and defining a longitudinally extending channel, one end of the insulative cylinder extending through the annular terminal portion of the second terminal means to said external separable portion, switching means comprising a switch head mounted at the other end of the insulative cylinder and a movable element constituted by a piston which is slidable along the cylinder, the piston frictionally engaging the switch head in the closed switch position, said switch head providing a chamber for housing a chemical propellant charge positioned to actuate the piston when the charge is ignited, a flexible conductor lead interconnecting the piston with the separable portion of the second terminal means, the lead extending along said channel, a current-limiting fuse connected in circuit between the switch head and the second terminal means, fault sensing means connected in circuit between the first terminal means and the switch head and triggering means responsive to said fault sensing means for igniting the chemical charge whereby, in the event of a fault; the piston is driven from the closed switch position thereby diverting fault current to the fuse, and is guided into striking contact with said separable portion and so separating said portion to isolate the surge arrester from ground.

8. A surge arrester disconnector according to claim 7, wherein the current limiting fuse comprises a helically coiled fusible element mounted in the housing coaxially with said insulative cylinder, the turns of said coiled element being shielded by insulation material to prevent arcing between adjacent turns.

* * * * *